UNITED STATES PATENT OFFICE.

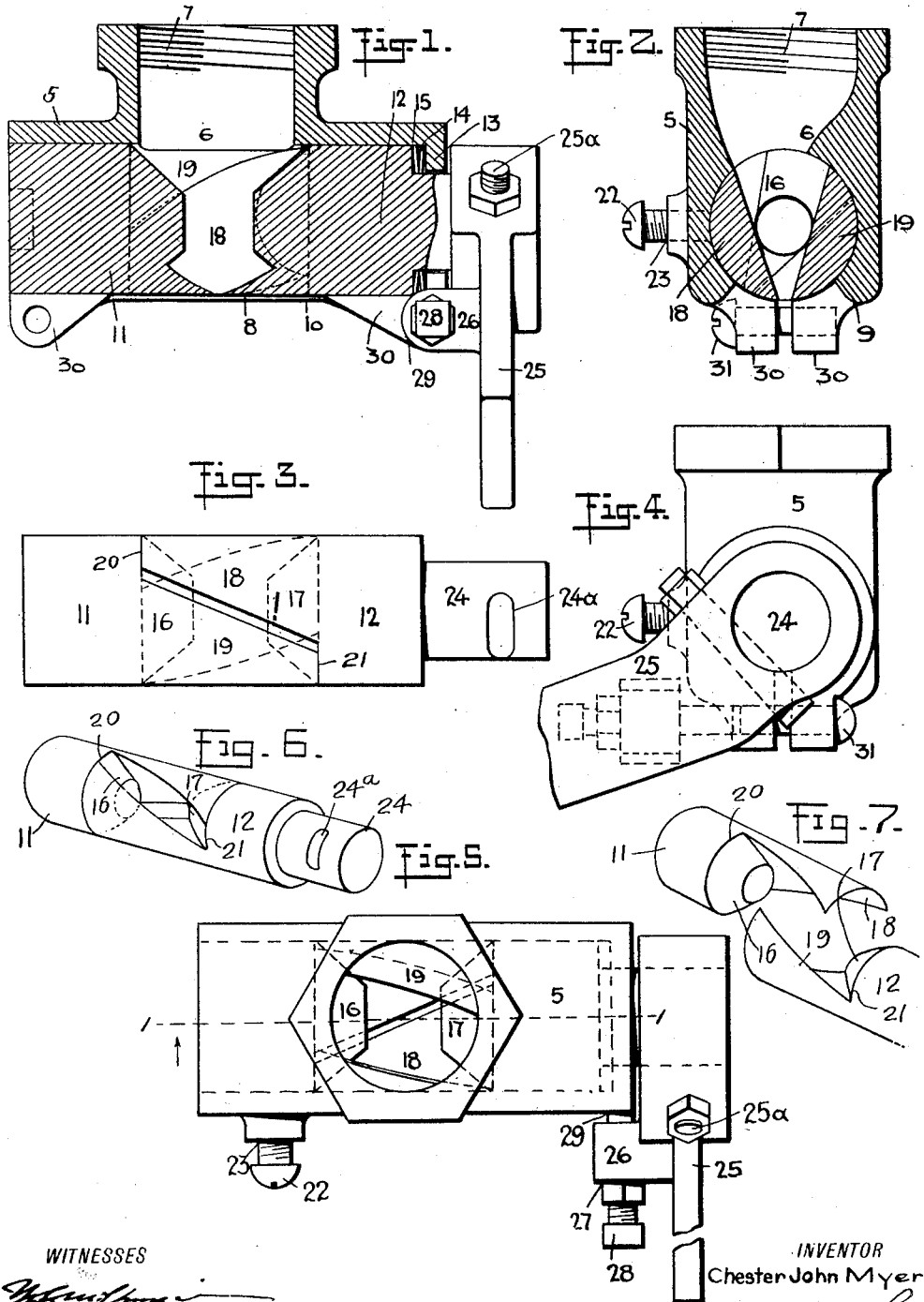

CHESTER JOHN MYERS, OF CORTLAND, NEW YORK.

NOZZLE.

1,112,311.   Specification of Letters Patent.   Patented Sept. 29, 1914.

Application filed January 25, 1913. Serial No. 744,145.

*To all whom it may concern:*

Be it known that I, CHESTER JOHN MYERS, a citizen of the United States, and a resident of Cortland, in the county of Cortland and State of New York, have invented a new and Improved Nozzle, of which the following is a full, clear, and exact description.

My invention has for its object to provide a nozzle with a split casing having ports, and means for holding the split casing against two companion valve members which have cone-shaped members facing each other, each of the valve members having a projection extending from one of its sides and seated between the casing and the cone-shaped member on the other valve member, the projections being spiral in shape, and being spaced from the axis of the nozzle, so that one of the valve members may be rotated relatively to the other valve member, to close the opening in the casing between the two ports or to leave a spiral opening through the casing of the nozzle from one port to the other.

Additional objects of the invention will appear in the following complete specification, in which the preferred form of the invention is disclosed.

In the drawings similar characters of reference indicate corresponding parts in all the views, in which—

Figure 1 is a sectional view of the invention on the line 1—1 of Fig. 5; Fig. 2 is a transverse sectional view of Fig. 5; Fig. 3 is an inverted plan view of the valve members; Fig. 4 is an end view of Fig. 5; Fig. 5 is a plan view of Fig. 4; Fig. 6 is a perspective view showing the relative positions of the valve members; and Fig. 7 is a perspective view showing the valve members spaced apart to illustrate their construction.

By referring to the drawings, it will be seen that the nozzle has a split casing 5, having a port 6 with an inner thread 7, by means of which the casing may be secured to a pipe, the split casing 5 having a second port 8, formed by the cut-away portions 9, at its split edges 10. Disposed in the split casing 5 there are two valve members 11 and 12, the valve member 12 being held yieldingly extended from the shoulder 13 on the casing 5 by means of the spring 14, which is disposed between the said shoulder 13 and an annular shoulder 15 on the valve member 12. The valve members 11 and 12 have cone-shaped bearing members 16 and 17. The valve member 11 has a projection 19 at one of its sides, and the valve member 12 has a projection 18 at one of its sides, these projections 18 and 19 being spaced from each other, and from the axis of the nozzle, the projection 18 having an end 20, which is disposed between the cone-shaped member 16 and the casing 5, the projection 19 having an end 21, which is disposed between the cone-shaped member 17 and the casing 5. It will therefore be seen that the ends 20 and 21 of these projections 18 and 19 will be disposed between the cone-shaped members 16 and 17 and the casing for holding the projections in position at all times. The projections 18 and 19 are spiral shaped, as shown in the drawings, so that the fluid passing through the nozzle will be given a spiral movement, as it passes between these projections 18 and 19. The fluid when passing between the cone-shaped members 16 and 17 is given a tendency to spread out fan-shaped along the direction of the axis of the cones. The valve member 11 is secured to the casing by means of a set screw 22, which meshes in a threaded orifice 23 in the casing, and engages the side of the valve member 11.

The valve member 12 is adapted to rotate in the casing and this valve member has a stud 24, to which is secured the lever 25 by means of the bolt 25ª disposed through the opening 24ª in the stud 24. This valve member 12 may be conveniently rotated by the lever 25. Secured to the lever 25 there is a lug 26 with a threaded opening 27, in which meshes a set screw 28, this set screw being adapted to abut against the end 29 of a lug 30 on the casing, for holding, after adjustment, the lever 25 and the valve member 12, in position relatively to the casing.

The casing 5 has lugs 30, with threaded orifices in which mesh screws 31, for holding the casing snugly against the valve members 11 and 12.

Having thus described my invention, I claim as new and desire to secure by Letters Patent:

1. In a nozzle, a casing having ports, two valve members in the casing, each of the valve members having a projection at its side extending toward the other valve member for seating against the other projection when one of the valve members is rotated relatively to the other.

2. In a nozzle, a casing having ports, two valve members in the casing, each of the valve members having a spiral projection at its side, extending toward the other valve member, the spiral projections being normally spaced apart, so that one of the valve members may be rotated relatively to the other to close the nozzle.

3. In a nozzle, a casing having ports, two valve members in the casing, each of the valve members having a bearing surface, and a projection at its side, extending toward the other valve member, the end of each of the projections being disposed between the bearing surface on the companion valve member and the casing.

4. In a nozzle, a casing having ports, two valve members in the casing, each of the valve members having a bearing surface, and a spiral projection at its side, extending toward the other valve member, the ends of the spiral projections being disposed between the bearing surfaces on the companion valve members and the casing.

5. In a nozzle, a casing having ports, two valve members in the casing, each of the valve members having a cone-shaped surface, and a projection at its side extending toward the other valve member, the ends of the projections being disposed between the cone-shaped surfaces and the casing.

6. In a nozzle, a casing having ports, and a shoulder, two valve members in the casing, each of the valve members having a projection at its side, extending toward the other member, the projections being normally spaced apart, so that one of the valve members may be rotated relatively to the other to close the nozzle, a spring disposed between the shoulder and one of the valve members, for holding the last-mentioned valve member extended, means for holding one of the valve members relatively to the casing, and means for rotating the other valve member.

7. In a nozzle, a casing having ports, and a shoulder, two valve members in the casing, each of the valve members having a cone-shaped surface, and a projection at its side extending toward the other valve member, the ends of the projections being disposed between the cone-shaped surfaces and the casing, a spring disposed between the shoulder and one of the valve members, for holding the last-mentioned valve member extended.

8. In a nozzle, a casing having ports, two valve members in the casing, each of the valve members having a bearing surface, and a projection at its side extending toward the other valve member, the projections being disposed within substantially the same cylindrical surface for seating against each other when one of the valve members is rotated relatively to the other and the ends of the projection being disposed between the bearing surface on the companion valve member and the casing.

9. In a nozzle, a split casing having a port, with cut portions at its split ends, forming another port, two valve members in the casing, each of the valve members having a projection at its side, extending toward the other valve member, the projections being normally spaced apart so that one of the valve members may be rotated relatively to the other, to close the nozzle.

10. In a nozzle, a split casing having a port, cut portions at its split ends, forming another port, there being an inner shoulder at one of the ends of the casing, two valve members in the casing, each of the valve members having a bearing surface and a projection at its side, extending toward the other valve member, the ends of the projections being disposed between the bearing surfaces on the companion valve members, and the casing, means for holding the split casing against the valve members, a spring disposed between one of the valve members and the shoulder, and means for rotating one of the valve members relatively to the casing.

In testimony whereof I have signed my name to this specification in the presence of two subscribing witnesses.

CHESTER JOHN MYERS.

Witnesses:
LUKE J. McEVOY,
DANIEL J. KEARNEY.

---

Copies of this patent may be obtained for five cents each, by addressing the "Commissioner of Patents, Washington, D. C."